UNITED STATES PATENT OFFICE.

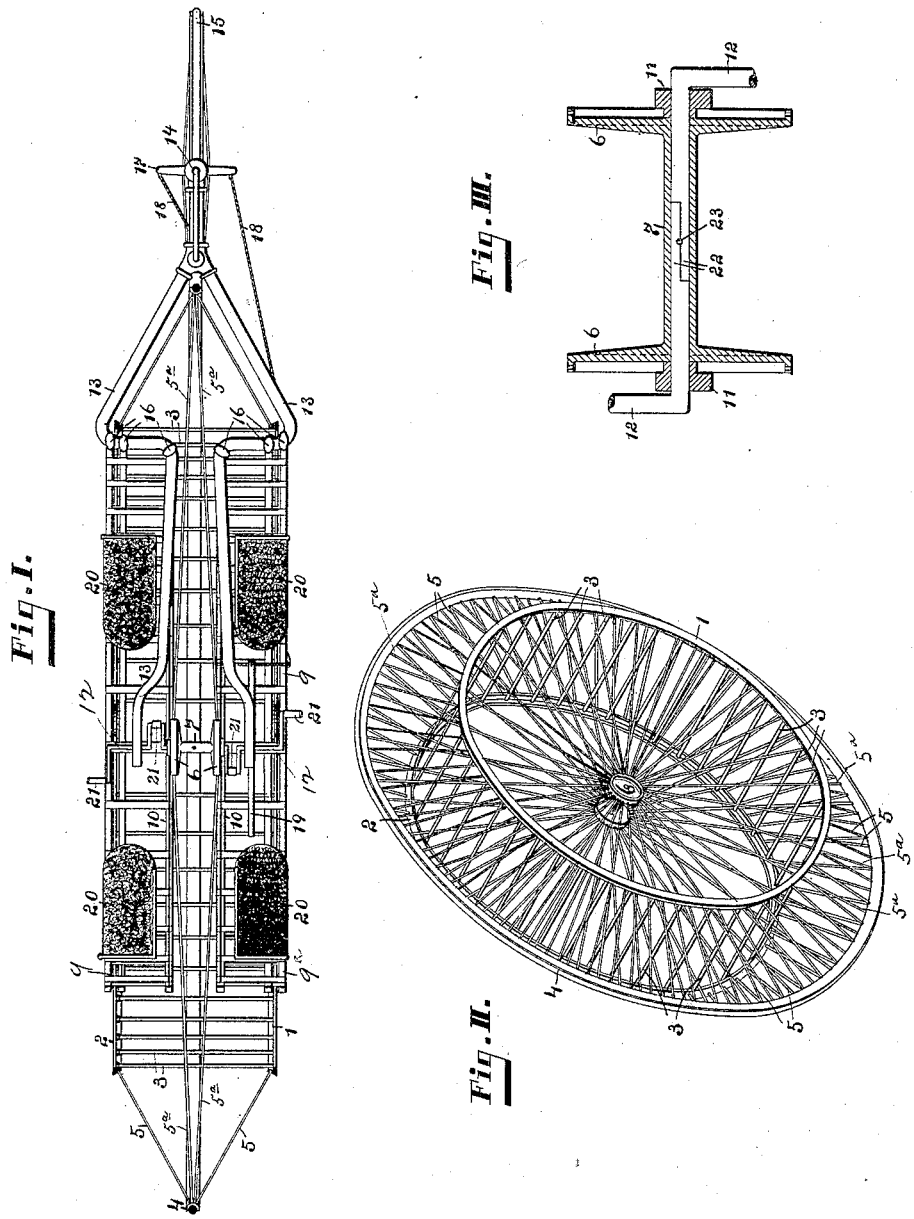

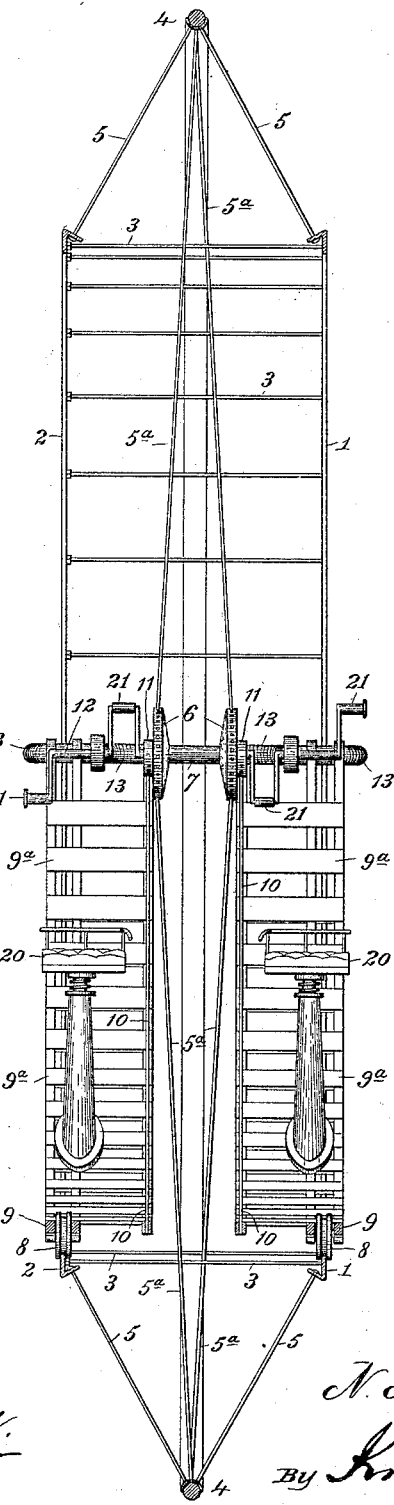

NUMON N. HORTON, OF KANSAS CITY, MISSOURI.

VELOCIPEDE.

SPECIFICATION forming part of Letters Patent No. 431,894, dated July 8, 1890.

Application filed October 25, 1889. Serial No. 328,111. (No model.)

*To all whom it may concern:*

Be it known that I, NUMON N. HORTON, a citizen of the United States, residing at Kansas City, in the county of Jackson and State of Missouri, have invented certain new and useful Improvements in Bicycles, of which the following is a full, clear, and exact description, reference being had to the accompanying drawings, forming a part of this specification.

My invention relates to certain new and useful improvements in bicycles; and my invention consists in features of novelty, hereinafter described, and pointed out in the claims.

Figure I is a horizontal section of my improved bicycle. Fig. II is a perspective view of the drive-wheel. Fig. III is a longitudinal section through the hub, showing the manner of securing the crank-shafts. Fig. IV is a vertical section of the improved bicycle on a larger scale.

Referring to the drawings, the drive-wheel is formed of two concave wheels 1 2 of equal diameter connected to each other by means of adjustable spreading-rods 3 and a center wheel 4 of greater diameter connected to the concave wheels by means of tension-spokes 5. The center wheel 4 (which is of course the one on which the bicycle travels) is also adjustably connected by tension-spokes $5^a$ to two rims 6, which are integral with the hub 7. The concave wheels 1 2 are made of metal and form tracks on which travel friction-pulleys 8, which are journaled to the rims or frames 9 of baskets suspended within the wheel, a basket being located on each side of the hub 7. The frames 9 may be made of wood or metal bent to form concentric with the wheel, or nearly so, and are connected by slats $9^a$ to form a floor. The baskets are also partly supported by rods 10, which connect the rims or frames 9 with eccentrics 11 on the crank-shafts 12.

13 represents a frame extending from the crank-shafts to the standard 14 of the steering-wheel 15. The rear ends of the baskets are secured to the frame 13 by means of loops 16, which serve as an additional support in conjunction with the friction-pulleys 8 and rods 10. The standard 14 is provided with arms 17, to which are attached steering-cords 18. The steering-cords extend forward, and are connected to a lever 19, which is pivoted to one of the baskets. By this means the rider can move the steering-wheel as may be desired.

Any desirable number of seats 20 may be employed mounted on the baskets 9 $9^a$. I have shown four such seats. It is intended that two or more riders shall sit on opposite sides of the wheel, so as to counterbalance one another and be in convenient reach of the hand-cranks 21 on the shaft 12, by which the wheel is propelled. I do not, however, limit myself to hand-power. Treadles may be used connected by rods to the cranks 21 in ordinary manner, or a motor of any common and suitable form may take the place of one of the seats 20, so as to drive the machine and counterbalance the weight of the driver on the opposite side of the wheels.

The crank-shafts are journaled to the forward end of the frame 13, and their inner ends are cut away for over one-half the diameter of the same to form a splice 22 in the center of the hub. (See Fig. III.) At the center of the hub, I form a hole 23, which extends through the hub and through the crank-shafts. Thus by inserting a pin through the hub and shafts I secure the shafts in their position and cause the hub to rotate with the shafts. By removing the pin the shafts may be withdrawn, if desired.

As I have filed of even date with this another application, in which certain details in the construction of the wheel are more clearly shown, I refer to the same as setting forth those details more clearly.

I claim as my invention—

1. As a new article of manufacture, a double concave wheel having endless tracks, a wheel of larger diameter encircling the concave wheel and having a hub and spokes, and means for connecting the wheels to each other, substantially as described, and for the purpose set forth.

2. As a new article of manufacture, a double concave wheel having endless tracks, a wheel of larger diameter encircling the same, tension-spokes connecting the outside wheel with the concave wheel, and adjustable spreading-rods interposed between the two sections of the concave wheel, substantially as described, and for the purpose set forth.

3. As a new article of manufacture, a double concave wheel, a wheel of larger diameter encircling the same, tension-spokes connecting the outer wheel with the concave wheel, adjustable spreading-rods interposed between the two sections of the concave wheel, and tension-spokes connecting the outer wheel with the hub, substantially as described, and for the purpose set forth.

4. In a bicycle, the combination of the drive-wheel having concave portions with endless tracks, crank-shafts secured to the hub of the wheel, and baskets partly supported by the crank-shafts and having friction-pulleys which travel on the endless tracks, substantially as described, and for the purpose set forth.

5. In a bicycle, the combination of the drive-wheel having endless side tracks, cranks 21, secured to the hub of the wheel-frame 13, steering-wheel 15, secured to the frame 13, baskets supported in the drive-wheel, and seats 20, secured to the baskets, substantially as described, and for the purpose set forth.

6. In a bicycle, the combination of the drive-wheel having a hub 7 and cranks 12 having their ends cut away for over one-half their diameter to form a splice 22 within the hub, said hub and cranks being provided with a hole 23 for the insertion of a pin, substantially as described, and for the purpose set forth.

NUMON N. HORTON.

Witnesses:
OCTAVIUS KNIGHT,
HERVEY S. KNIGHT.